FIG. 2

3,439,327
SYSTEMS FOR PROTECTION AGAINST
ERRORS IN TRANSMISSION
Roger P. Sourgens, Bourg-la-Reine, France, assignor to Societe d'Applications Generales d'Electricite et de Mecanique, Paris, France, a company of France
Filed July 22, 1965, Ser. No. 473,968
Claims priority, application France, July 23, 1964, 982,828
Int. Cl. H04l 3/02, 15/34; G08b 29/00
U.S. Cl. 340—146.1                3 Claims

ABSTRACT OF THE DISCLOSURE

Telegraphic system with error detecting means. The transmitter station comprises a code converting unit for converting signals formed of a given number of binary code elements into signals formed of a larger number of binary code elements exhibiting a predetermined number of transitions between the zero and the one value. At the receiver station the reverse conversion is carried out. The receiver station comprises two means for checking the transmitted signals. The first counts the number of transitions. The second checks that the transitions occur at predetermined instants from the beginning of the signals and includes means for deriving short pulses from the signal transitions and means for gating said pulses within time slots centered at these predetermined instants.

---

The present invention relates to a telegraphic transmission system having particular advantages with regard to protection against errors due to disturbances which occur on transmission channels.

Various methods are known for protection against errors in telegraphic transmission where the checking of a given criterion is effected character by character and particularly the methods of parity check in which, added to the code elements of each character which ensure the transmission of the information, there are additional elements, the purpose of which, conventionally, is to make the number of positive or negative code elements even or odd; said code elements being considered as a whole or in accordance with a given classification in the character. Systems are likewise known which are based on a code of the p out of n kind according to which the numbers of positive and negative code elements which constitute each character are in a constant relationship. As a general rule, in the receiving devices which use such codes, the incoming modulation signal is sampled by sampling pulses situated in the theoretical centers of the elements which constitute them. These samples are then used by the translating members and printing members if it is a question of ordinary telegraphy or by the error-checking members if it is a question of data transmission. Sometimes, a regenerated modulation is created completely from these samples. Such a method, which leads to attributing a conventional form to all the incoming signals indiscriminately, whether it is a question of useful modulation or of interference, affords results which are generally regarded as satisfactory for radio channels, but which are very disappointing for conductor wire channels. Actually, on these channels, fading proper is non-existent, but breaks are frequently found in channels and may be very short or relatively long and these cause the disappearance of certain changes of polarity of the telegraphic signal or introduce interference signals, which are composed of successions of positive and negative pulses, which, on sampling in the receiving devices, may be detected as false code elements. In the following, the change of polarity or the change of binary value of the signal will be called "mutation."

The object of the invention is to permit an effective detection of the errors in transmission in telegraphic transmission systems, particularly in the field of telegraphy by means of conductor circuits.

One feature of the telegraphic transmission system according to the invention is to use a code of the p out of n type according to which the information-carrying element is not a positive or negative current element having a duration equal to a unit period, but a reversal of polarity or mutation.

Another feature of the telegraphic transmission system according to the invention is to comprise in the receiving means, a device for protection against the transmission errors which regards as erroneous, on the one hand any character which comprises a number of mutations which does not correspond to the p out of n code adopted, and on the other hand any character within which at least one mutation appears outside predetermined time limits bounding particular instants conventionally fixed for the placing of each possible mutation inside each character transmitted.

The invention will be better understood on reading the following description and examining the accompanying drawings in which:

FIGURE 2 shows an example of an alphabet comprising three actual mutations out of seven possible mutations which may be used in the system of the invention;

Figure 1:
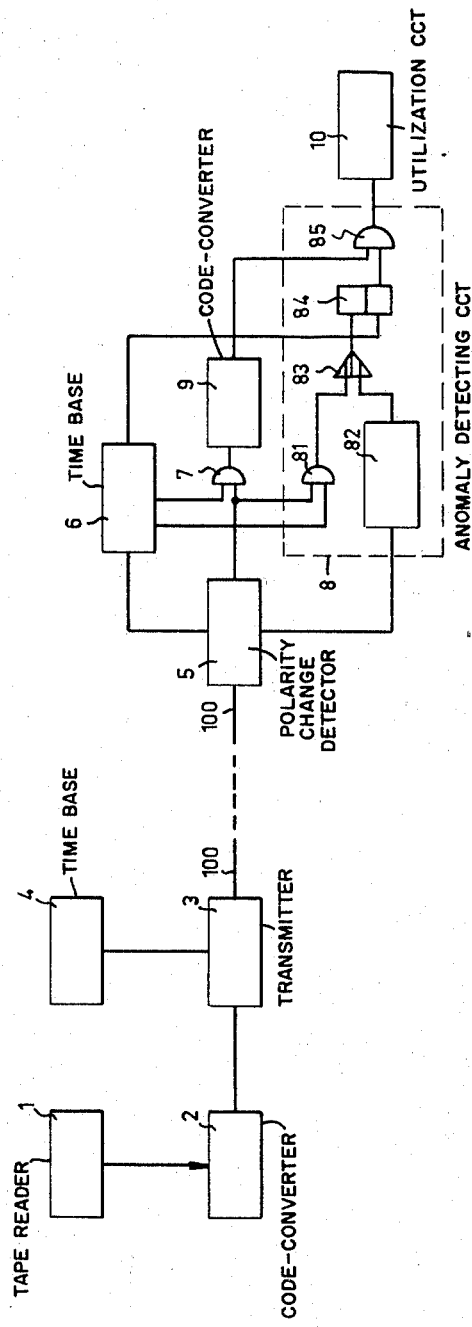
FIGURE 1 is a block diagram of a telegraphic system according to the invention.

The telegraphic system illustrated in FIGURE 1 in the form of a block diagram consists of a transmission unit and a receiving unit connected to the ends of a telegraphic channel 100.

The transmisison unit comprises:

Reading means 1 for the information to be transmitted which is coded into start-stop signals comprising five code elements;

Code-conversion means 2 enabling the code of the read-out signals to be converted into a code of the p out of n type relating to the mutations;

Means 3 for transmitting the code-converted information over the channel 100;

A time base 4 determining the transmission moments for the mutations used.

The receiving unit comprises:

Means 5 for detecting the mutations appearing over the line 100;

A time base 6 enabling said mutations to be located in time;

Means 7 for distributing the mutations situated within the normal time limits;

A sub-assembly 8 enabling the characters in which the mutations comprise an anomaly to be detected and their use to be forbidden, and Means for utilising the mutations retained, comprising, for example, an appropriate code converter 9 and recording or calculating means 10.

The sub-assembly 8 comprises:

Means 81 for selecting the mutations situated outside the normal limits;

Means 82 for counting the mutations in each character, which means supply a signal when this number is abnormal;

Means 83 for collecting the causes of rejection;

Means 84 for storing every cause of rejection until the end of the character where such a cause has appeared, and Means 85 for preventing the use of the characters in the course of which a cause of rejection has been discovered.

The example described below with reference to FIGURES 3 and 4 relates to a particular non-limiting application of the invention, to a connection of the start-stop type, for which an alphabet is used comprising three mutations out of seven possible ones such as that illustrated in FIGURE 2. It will be noted that the use of three mutations out of seven possible ones leads to an alphabet comprising 35 different combinations. Thirty-two of these have been selected in accordance with the number 2 international telegraphic alphabet. Three combinations are therefore available for signalling or functional instructions.

Figure 3:
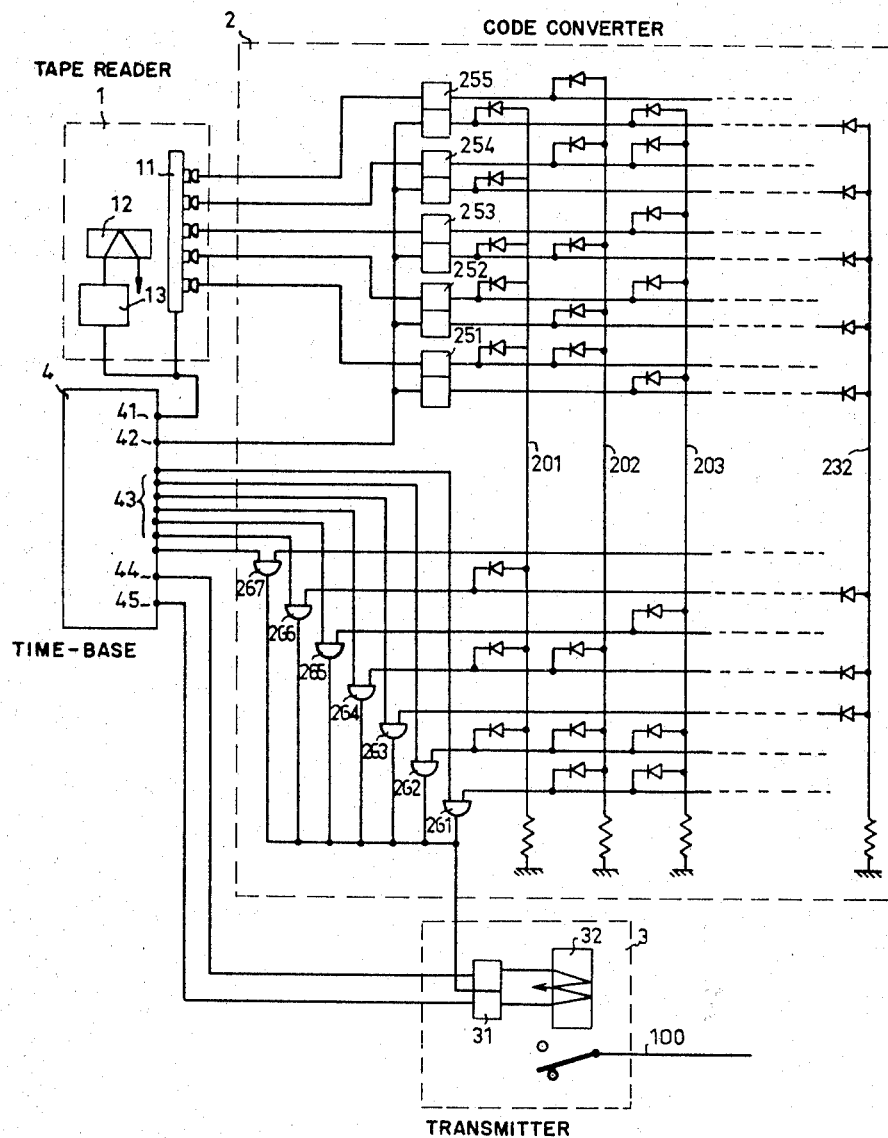
FIGURE 3 is a logic diagram of a transmission device according to the invention using a code such as that illustrated in FIGURE 2.

The transmission unit illustrated in FIGURE 3 comprises:

A device for reading five-hole punched tape 1, comprising a reader proper 11 with its driving electro-magnet 12 and an amplifier 13 feeding such electro-magnet;

A code converter 2 consisting of read-out stores represented by five trigger circuits 251 to 255, output gates 261 to 267, connecting busbars 201–232 equal in number to that of the alphabetic combinations used, and of which only the first three 201, 202, 203 and the last one 232 have been illustrated so as to avoid over-burdening the figure unnecessary;

A transmitter 3 connected to the line 100 and comprising a telegraphic relay 32 controlled by a trigger device 31;

A time base 4 adapted to distribute the functional control pulses.

Each of the connecting bus-bars 201 to 232 is connected by means of diodes, on the one hand to the one or zero outputs of the five trigger circuits 251 to 255 according to the character of the code to which it corresponds, and on the other hand to an input of three of the gates 261 to 267 selected according to the position of the three mutations in the same character in the code of the three out of seven type adopted for the transmission.

Figure 4:
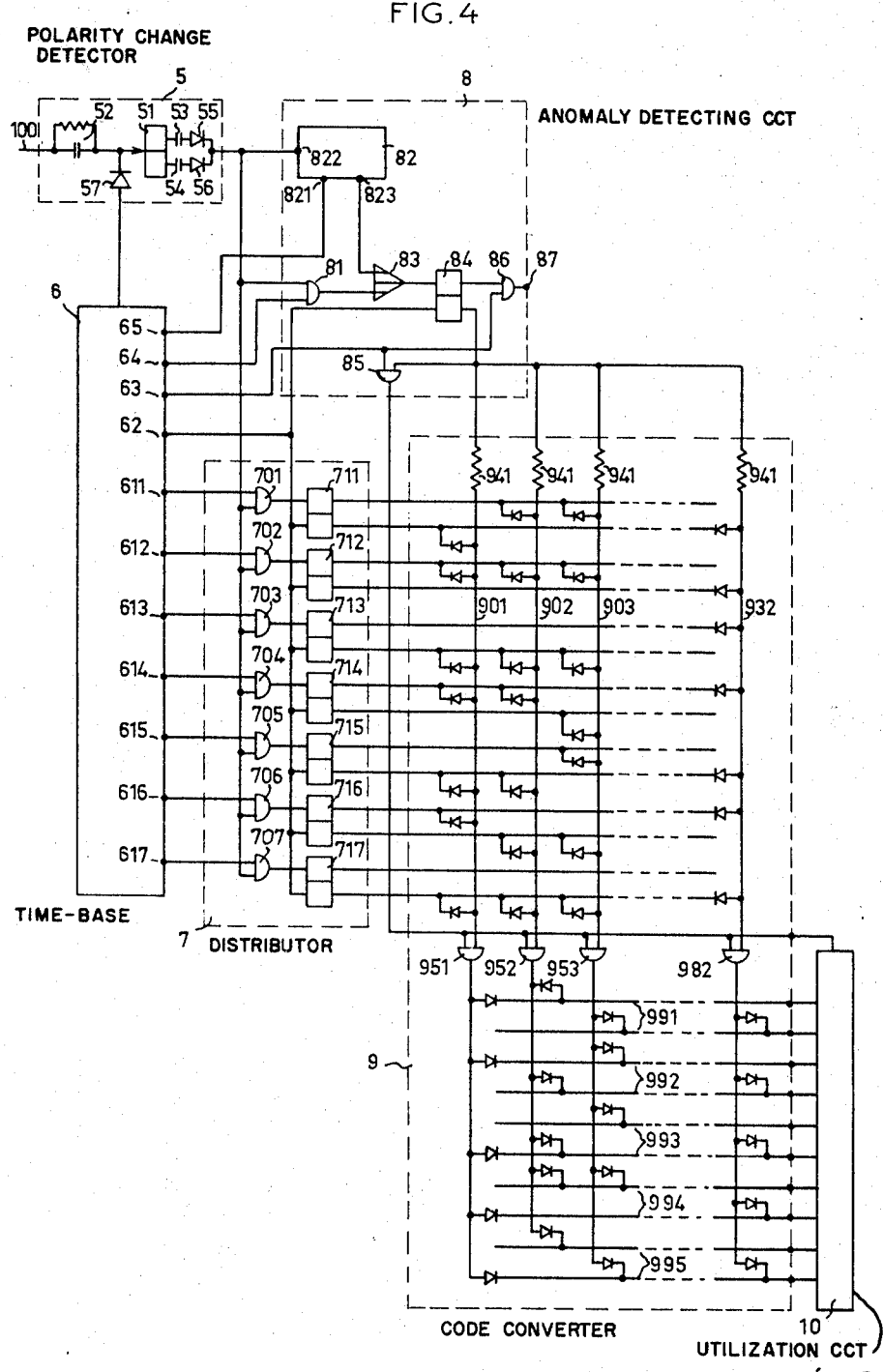
FIGURE 4 is a logic diagram of a receiving device according to the invention permitting the reception and checking of the signals transmitted by the device of FIGURE 3.

The receiving unit is illustrated in FIGURE 4. The means 5, for detecting the mutations appearing over the line 100, comprise a receiving trigger 51 ensuring the detection of the mutations appearing over the line 100, which are transmitted thereto by a differentiating circuit 52. The two outputs of trigger 51 are connected in parallel to a capacitor 53, 54 which is in series with a diode 55, 56 so as to supply a pulse of uniform polarity whatever the direction of the mutation recorded. Negative pulses are transmitted to the time base 6 through a diode 57 and appear at the output of the differentiating circuit 52.

The time base 6, which is released for the duration of a receiving cycle, by the first negative pulse which it receives when it is blocked, supplies:

(a) Through seven terminals 611 to 617, positive control pulses, the centers of which correspond to the normal periods of appearance of the mutations in relation to the start mutation which initiated the cycle, and the width of which corresponds to the tolerated margin of jitter due to the distortion;

(b) Through a terminal 62, a pulse situated at the beginning of each cycle and adapted to control the reset of the trigger circuits;

(c) Through a terminal 63, a pulse situated at the end of each cycle and adapted to control output recordings;

(d) Through a terminal 64, a series of positive pulses situated in the intervals between the positive pulses supplied by the seven terminals 611 to 617;

(e) Through a terminal 65, a clock pulse determining the limits of each receiving cycle.

In the sub-assembly 8, which is in accordance with the basic diagram in FIGURE 1, the means for selecting those mutations which are outside the normal limits are an AND gate 81 which transmits, by means of the OR gate 83, to the actuating input of the trigger circuit 84, the mutations which appear at the output of the polarity change detector 5 during the square-wave pulse train issued from the terminal 64 of the time base 6, and the counting means are a pulse counter 82 which receives on the one hand, through terminal 821, the signal for the beginning and the end of the receiving cycle transmitted from the terminal 65, on the other hand, through terminal 822, a pulse for each mutation received by the polarity change detector 5, counter 82 applies, through terminal 823 and gate 83, an actuating pulse to the trigger circuit 84, whenever the number of mutations per cycle is different from three. The reset input of the trigger circuit 84 is connected to the treminal 62 at which a pulse appears at the beginning of each receiving cycle. The inoperative output of the trigger circuit 84 is connected to the release input of the gate 85, the second input of which is connected to the terminal 63 which delivers a pulse at the end of a receiving cycle, and its operative output is connected to the input of an AND gate 86, of which the second input is connected to the terminal 63 and its output to a terminal 87 at which a pulse thus appears at the end of a cycle for each erroneous character.

The device 7 for recording normal mutations, comprises in the first instance seven gates 701 to 707 which are opened successively by the control pulses issued from the seven terminals 611 to 617 during the normal period associated with each mutation according to its rank, and which receive, in parallel, all the pulses issued from the polarity change detector 5; secondly, seven trigger circuits 711 to 717, each of which is rendered operative by every pulse passing through the corresponding gate 701 to 707 and reset at the beginning of each cycle by a pulse leaving the terminal 62.

Figure 2:
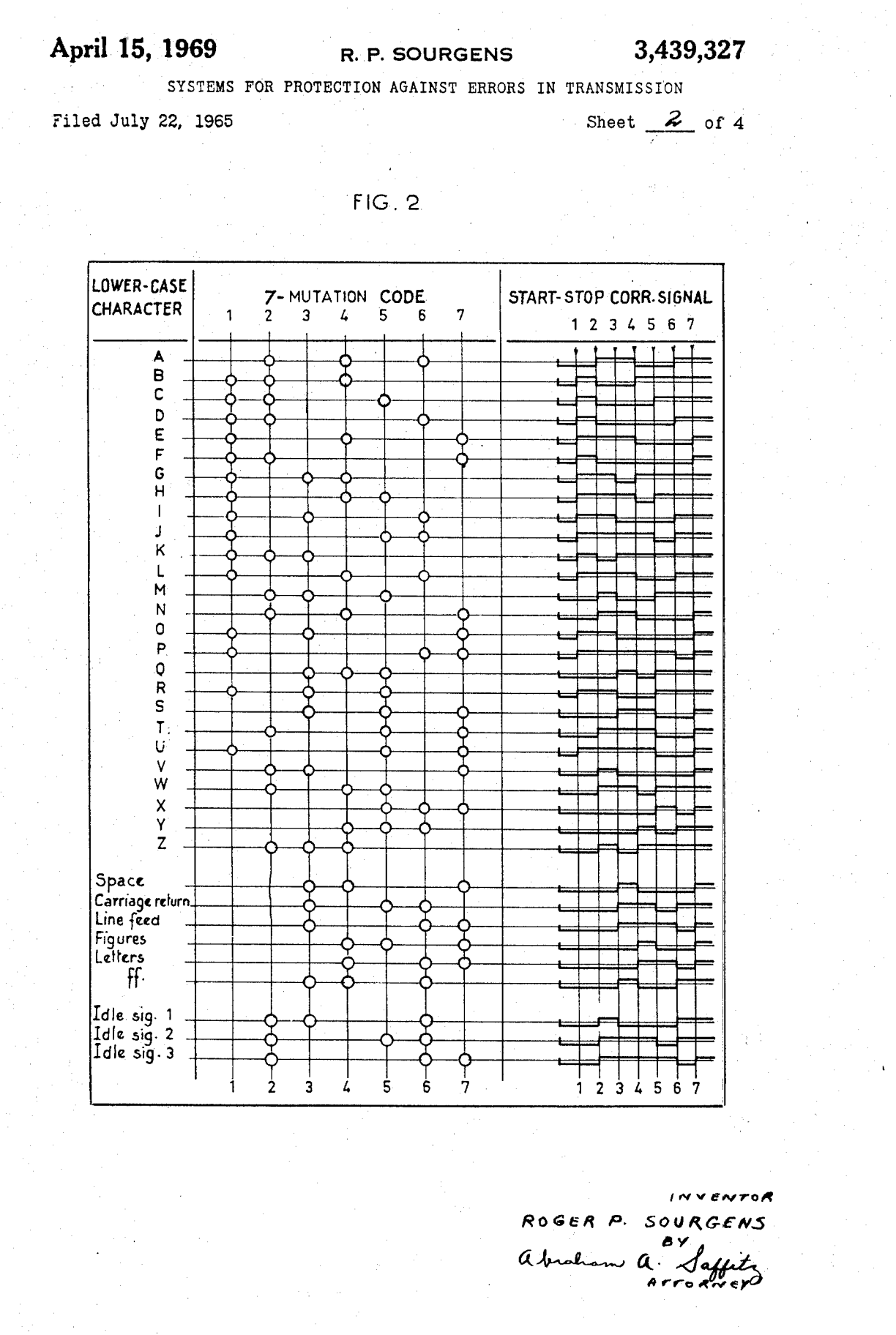

The code-converter unit 9 comprises thirty-two decoding bus-bars 901 to 932 each of which is associated with one of the thirty-two characters in the code of FIGURE 2 and five coding double bus-bars 911 to 955 which produce the original coded information at the input to the utilisation device 10.

Each of the bus-bars 901 to 932 is connected through a diode to the one or zero output of each of the trigger circuits 711 to 717 according to whether or not the character with which it is associated comprises a mutation corresponding in rank to that of the trigger circuit, and on the one hand, through a resistor 941, to the zero output of the trigger circuit 84, and on the other hand to an input of AND gates 951 to 982, the second input of which is connected to the output of the gate 85.

Each of the gates 951 to 982 has its output connected through diodes, to one or the other of the bus-bars of each of the pairs of bus-bars 991 to 995 according to the polarity of each of the five elements in the character in the number 2 international code corresponding to the character having three mutations out of seven, with which is associated the decoding bus-bar 901 to 932 connected thereto. The output of the gate 85 is likewise connected to an actuating input of the utilisation device 10.

The operation of the transmitting unit is indicated below. At the beginning of each cycle, a pulse leaving the terminal 42 of the time base 4, restores the trigger circuits 251 to 255 to their zero position. Immediately afterwards, a pulse leaving the terminal 41 transfers the information read by the reader 11 to the trigger circuits 251 to 255 while an advance step is controlled by the same pulse applied to the electro-magnet 12 by means of the amplifier 13.

All the connecting bus-bars 201 to 232 with the exception of one, are rendered negative, through at least one diode, by means of at least one of the trigger circuits 251 to 255. Only the connecting bus-bar, of which the connections through diodes to the output bus-bars of the trigger circuits 251 to 255 correspond precisely to the character recorded by said trigger circuits remains at a relatively positive potential. With the co-operation of three diodes, this connecting bus-bar in turn opens those of the gates 261 to 267, the combination of which corresponds, in the alphabet with three mutations out of seven in FIGURE 2, to the five code character which it represents. The pulses leaving the seven terminals 43, staggered in time, find these three gates open, and are applied to the symmetrical input of the trigger circuit 31, which changes its state whenever it receives a pulse.

It should be noted that at the moment 0 in the cycle, a pulse leaving the terminal 44 brought the trigger circuit 31 into the position corresponding to the start signal. As a result, after three mutations, the trigger circuit 31 is automatically in the stop position at the end of a cycle. As a precaution, a pulse leaving the terminal 55 at the end of each cycle forces the trigger circuit 31 to resume said stop position.

Thus the transmission relay 32, controlled by the trigger circuit 31, transmits a start-stop modulation with a start element, six code elements and a stop element in accordance with that in the second column of FIGURE 2.

The operation of the receiver is indicated below.

The line signals actuate the input relay 51. As soon as a start element appears, the time base 6 is started for one cycle by means of the diode 57. On the other hand, all the mutations, whatever their direction, give rise, at the output of the unit 5, to pulses of the same polarity which are applied to the distribution gates 701 to 707, to the gate 81 for selecting mutations outside the limits, and to the input 822 of the counter 82.

The gates 701 to 707 are opened successively by rectangular pulses, staggered in such a manner that each of them can afford passage to a pulse corresponding to a mutation of given rank in each character to actuate the trigger circuit 711 to 717 associated therewith. Thus three of these trigger circuits are normally set for each character and a reset pulse transmitted from the terminal 62 is applied to all of them at the beginning of each cycle.

In these circumstances, only that one of the decoding bus-bars 901 to 932 of which the connections to the trigger circuits 711 to 717 correspond to the combination recorded thereby, remains positive during normal reception. Therefore only one of the gates 951 to 982 controlled by these connecting bus-bars is passing and the pulse leaving the terminal 63, at the end of a cycle, passes through it and arrives, through the five pairs of bus-bars 991 to 995, at the five double inputs of the utilization device 10, where the representation of the original combination with five code elements, read by the reader 11 of the transmission unit, is thus reconstituted.

If the number of mutations recorded in the course of a character is deficient or excessive, a pulse leaving the counter 82 through the terminal 823 passes through the OR gate 83 and brings the trigger circuit 84 into such a position that the polarity applied to the decoding bus-bars through the resistors 941 is negative. In these circumstances, none of the gates 951 to 982 can open. On the other hand, the gate 86 controlled by the one output of the trigger circuit 84 is open and the pulse leaving 63 at the end of a cycle passes through it to constitute an error signal appearing at the terminal 87, and may be used for any purposes such as control, statisitcs, and return signalling.

If one of the mutations comes outside the normal zones of jitter, it finds the gate 81 open as a result of the positive control pulses leaving 64 outside these zones, and gives rise to the same error process as before, by means of the gate 83 and the trigger circuit 84.

I claim:
1. A telegraphic transmission system with error detecting means including a transmitter station and a receiver station comprising a first code converting unit at the transmitter station for converting first signals formed of a given number of code elements capable of taking a zero value and a one value into second signals formed of a larger number of code elements capable of taking a zero value and a one value, each of said second signals exhibiting a predetermined number of transitions between the zero and one values occurring at predetermined instants from the beginning of said first transmitted signal, a second code converting unit at the receiver station for converting said second signals into said first signals, means for deriving pulses form the transitions of the second signals, said derived pulses coinciding with said transitions, means for counting said pulses, means for gating said pulses within time slots centered at said predetermined instants, means for detecting those of said pulses which fall outside said time slots, and means for inhibiting said second code converting unit in response to both said counting means and detecting means.

2. A telegraphic transmission system with error detecting means as set forth in claim 1 in which the first signals are the start-stop signals with five code elements of the International Telegraph Alphabet No. 2 and the second signals are start-stop signals with six code elements, each of said second signals exhibiting three transitions between the zero and one values.

3. A telegraph transmission system with error detecting means as set forth in claim 1 in which the time slots centered at predetermined instants of the second signals have a duration equal to that of a code element of said second signals.

References Cited

UNITED STATES PATENTS

| | | | |
|---|---|---|---|
| 2,706,215 | 4/1955 | Van Duuren | 340—146.1 X |
| 2,737,545 | 3/1956 | Augustin | 178—3 |
| 3,195,107 | 7/1965 | Rudolph | 340—146.1 |
| 3,381,271 | 4/1968 | Van Duuren. | |

MALCOLM A. MORRISON, *Primary Examiner.*

CHARLES E. ATKINSON, *Assistant Examiner.*

U.S. Cl. X.R.

178—23